United States Patent [19]

Meripol

[11] 3,796,230

[45] Mar. 12, 1974

[54] BALL CHECK VALVE HAVING IMPROVED GUIDE ASSEMBLY

[75] Inventor: Robert B. Meripol, Fayetteville, Ark.

[73] Assignee: Dresser Industries, Inc., Dallas, Tex.

[22] Filed: Oct. 16, 1972

[21] Appl. No.: 298,164

[52] U.S. Cl. .................... 137/533.11, 137/533.27
[51] Int. Cl. ............................................. F16k 15/04
[58] Field of Search . 137/519, 525, 533.11, 533.15, 137/533.17, 533.21, 533.23, 533.25, 533.27, 533.29, 533.31, 539, 539.5, 543.15, 543.23

[56] References Cited
UNITED STATES PATENTS

| 1,018,126 | 2/1912 | Nageborn | 137/533.11 |
| 382,655 | 5/1888 | Montgomery | 137/533.11 X |
| 521,530 | 6/1894 | Wall | 137/533.11 |
| 1,006,852 | 10/1911 | Kelsey | 137/533.17 |

FOREIGN PATENTS OR APPLICATIONS

| 499,934 | 12/1919 | France | 137/533.25 |
| 318,497 | 1/1920 | Germany | 137/533.17 |

*Primary Examiner*—Robert G. Nilson
*Attorney, Agent, or Firm*—John N. Hazelwood; William E. Johnson, Jr.; Michael J. Caddell

[57] ABSTRACT

The ball in the valve assembly has a conical cavity which is used to guide the ball onto a cone whose tip extends into the conical cavity of the ball at rest on the seat of the valve. The tip of the cone guides the ball onto the cone each time the ball rises. In an alternative embodiment, the cavity within the ball is cylindrical shaped, and the tip of a cylindrically shaped guide extends into the cavity whereby the tip of the cylinder guides the ball onto the cylinder each time the ball rises. In yet another embodiment, a cylindrical shaped guide is molded as an integral part of the ball, the tip of the cylinder extending into a cylindrical shaped housing whereby the cylinder is guided into the housing each time the ball rises. The embodiments utilizing cylindrical shaped guides and cavities or receptacles are sized such that a limited amount of rotation of the ball can occur.

4 Claims, 3 Drawing Figures

PATENTED MAR 12 1974 3,796,230

BALL CHECK VALVE HAVING IMPROVED GUIDE ASSEMBLY

BACKGROUND OF THE INVENTION

This invention relates generally to ball valves, and in particular, to ball check valves having centrally-oriented guides for control of the ball while off the seat.

Ball check valves are well known in the art wherein the ball, usually constructed of rubber, comes off the seat when there is excess pressure from beneath the seat and settles back onto the seat whenever the pressure above the ball exceeds that of the pressure below the seat. In such prior art constructions, there have been various means for providing vertical circumferential guidance of the ball while off the seat. These prior art devices are generally very expensive to manufacture because of the required milling operations, as well as inherently reducing the fluid passage around the ball.

It is therefore the primary object of the present invention to provide a new and improved ball valve assembly wherein the vertical guides normally used for providing circumferential guidance of the ball while off the seat are eliminated;

It is also an object of the invention to provide a new and improved ball valve assembly wherein additional fluid is allowed to flow around and through the ball valve assembly.

SUMMARY OF THE INVENTION

The objects of the invention are accomplished, generally, by apparatus wherein means are provided for eliminating the circumferential vertical guides around the ball in a ball valve assembly and replaced by means for central guidance of the ball. Such central guidance means includes embodiments where a centralized guide member is placed within a cavity in the ball and also where an integral guide member on the ball is placed within a central receptacle of similar geometry.

These and other objects, features and advantages of the present invention will be more readily understood by a reading of the following detailed specification and drawing, in which.

Figure 1:
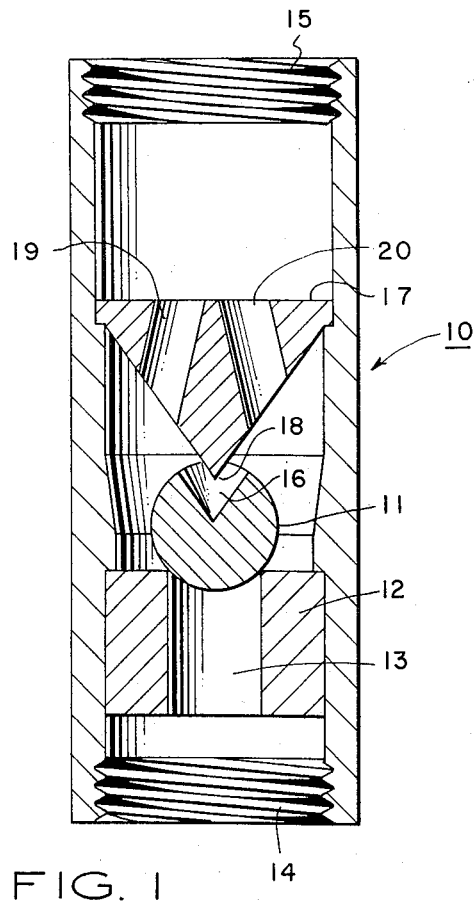
FIG. 1 is a view, partly in cross section, of a ball valve assembly according to the present invention wherein a conical shaped cavity in the ball is used with a conical shaped guiding member.

Referring now to the drawing in more detail, especially to FIG. 1, there is illustrated a ball check valve assembly 10 having a ball 11 and a seat 12 and a fluid passage 13 beneath the seat 12. The ends 14 and 15 of the valve assembly 10 have female threads for connection to various utility mechanisms, for example, such as a downhole pump assembly useful in the pumping of oil wells. The ball 11 has a conical shaped cavity 16. A conical shaped guide member 17 is mounted interior to the apparatus 10 in such a manner that the tip 18 of the cone 17 is within the cavity 16 of the ball 11 while the ball is resting on the seat 12. Ports 19 and 20 are provided within the cone shaped guide member 17 for allowing fluid to pass from the end 14 of the assembly 10 to the end 15 whenever the ball 11 is off the seat 12. Although the ports 19 and 20 are shown as being angled to provide additional fluid flow, it should be appreciated that they can also be aligned along the longitudinal axis of the valve assembly 10 if desired.

In the operation of the apparatus according to FIG. 1, the ball 11 remains on the seat 12 so long as the pressure above the valve exceeds the pressure below the valve. As with conventional ball check valves, as soon as the pressure below the ball exceeds the pressure above the ball, the ball 11 will come off the seat 12. As the ball 11 rises, it will be guided by the conical shaped member 17 until such time as the pressure is reduced and the ball 11 settles back on the seat 12. It should be appreciated that because of the angle of the conical shaped cavity 16, the ball provides a variable contact circle along its lower end as is the case with conventional ball valves to provide additional wearing surfaces of the ball. Thus, the ball is allowed to rotate an amount as determined by the extremities of the conical cavity. Furthermore, since no circumferential guidance is needed for vertically guiding the ball 11 while off the seat 12, there is provided additional flow passage around the circumference of the ball 11.

Figure 2:
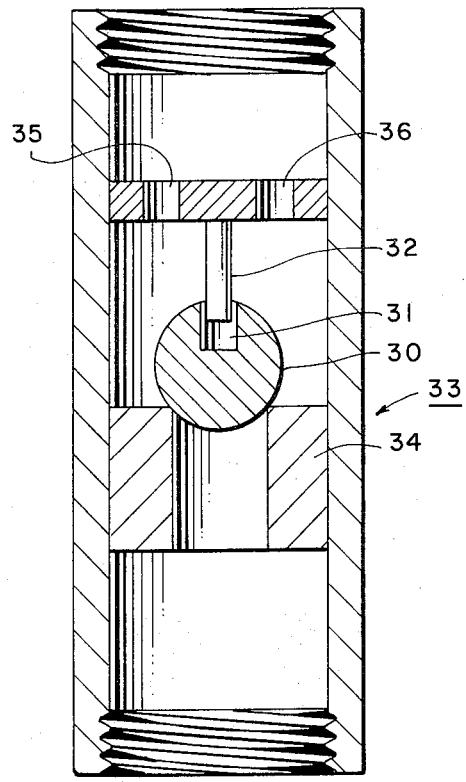
FIG. 2 is an alternative embodiment of the present invention wherein a cylindrical shaped cavity in the ball is used with a cylindrical shaped guiding member.

Referring now to FIG. 2, there is illustrated an alternative embodiment of the ball valve assembly according to the present invention wherein a ball 30 has a cylindrical shaped cavity 31, and a cylindrical shaped guide member 32 is provided within the valve assembly 33 such that the lower extremity of the cylindrical probe 32 extends into the cavity 31 while the ball 30 is on the seat 34. The guide assembly having the probe 32 has ports 35 and 36 for allowing fluid to pass from one end of the valve 33 to the other end whenever the ball 30 is off the seat 34.

The operation of the apparatus of FIG. 2 is much like that of the apparatus of FIG. 1 in that the ball 30 receives vertical centralized guidance from the cylindrical shaped member 32 as it rises off the seat 34. As soon as the pressure drops beneath the ball 30, the ball 30 is guided back down along the member 32 onto the seat 34. The diameter of the cavity 31 is preferably made large enough such that the ball 30 can rotate to some extent to provide even ball wear and thus longer life of the valve assembly.

Figure 3:
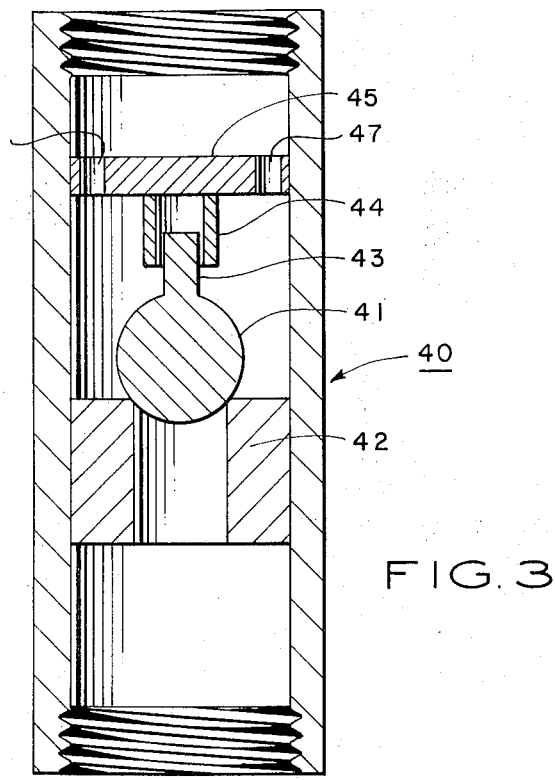
FIG. 3 is an alternative embodiment of the invention wherein the guiding member is an integral part of the ball and is used with a centralized receptacle within the valve housing designed to receive the guiding member.

Referring now to FIG. 3, an alternative embodiment of the invention is provided wherein a ball valve assembly 40 has a ball 41 and a seat 42. The ball 41 includes an integral cylindrical shaped extension 43, the upper extremity of which extends into a cylindrical shaped receptacle 44 attached to a bridging member 45 within the valve assembly 40. The bridging member 45 has a pair of ports 46 and 47 for allowing fluid to flow from one end of the valve assembly 40 to the other whenever the ball 41 is off the seat 42. It should be appreciated that the inside diameter of the cylindrical shaped housing 44 is sized such that there is room for the ball 41 to rotate to some extent to provide additional wear characteristics of the ball 41 on the seat 42.

In the operation of the apparatus of FIG. 3, as the pressure beneath the ball 4 exceeds the pressure above the ball 41, the ball rises off the seat 42 and is guided in a vertical direction as the cylindrical shaped member 43 passes through the cylindrical shaped receptacle 44. As the pressure is reduced, the ball 41 settles back onto the seat 42 but not necessarily at the same point of contact as previously because of the variable contact area provided by the amount of rotation of the ball.

Thus, there has been described and illustrated herein the preferred embodiments of the present invention wherein the circumferential vertical guides normally associated with a ball valve assembly are eliminated and replaced by mean for centrally guiding the ball substantially along the longitudinal axis of the valve assembly. It should be appreciated, however, that various modifications of the embodiments illustrated herein will be apparent to those skilled in the art from a reading hereof, for example, such as using various shaped guides and variously shaped cavities within the balls, as well as various combinations thereof. For example, instead of conical or cylindrical shaped members and/or cavities, one could if desired use geometries which do not match, such as using a square shaped cavity and a cylindrical shaped guiding member, or vice-versa.

It should also be appreciated by those in the art that the various cavities, receptacles and guide members illustrated and described herein can be fabricated from various materials other than rubber, for example, metal, plastic, and the like, and that when using rubber or some other such material, the various cavities, receptacles and guide members can be at least partially lined with other such materials, for example, plastic, to prevent sticking between the moving parts during the engagement thereof.

The embodiments of the invention in which an exclusive property or privilege is claimed are defined as follows:

1. A ball check valve assembly comprising:
   a housing having a flow passage therethrough;
   a ball valve seat assembly mounted in said housing and in said flow passage;
   a ball adapted to be seated on said seat assembly, said ball having a conical cavity therein; and
   a guide member in said housing extending into said cavity to provide guidance of said ball as said ball is lifted off said seat in response to a pressure differential across said ball, wherein said guide member further comprises a conical shaped projection.

2. The apparatus of claim 1 wherein said housing is a substantially cylindrical, tubular, elongated member adapted to be inserted into an oil well casing string and said check valve assembly is arranged to allow axial flow in one direction along the axial bore of said tubular housing.

3. The apparatus of claim 2 wherein said guide member and said conical cavity in said ball are sized so as to provide partial rotation of said ball about any axis with respect to said guide member whereby a plurality of valve seating surfaces are provided on said ball.

4. An oil well check valve assembly capable of downhole valving service, said valve assembly arranged to provide extended life, comprising:
   a tubular cylindrical housing having a relatively large and unrestricted axial bore passing therethrough, said housing arranged to be interconnected in an oil well conduit string and to pass well fluids therethrough;
   a substantially cylindrical annular ball seat fixedly located concentrically within said housing and having an axial passage therethrough arranged to flow well fluids passing through said housing;
   a generally spherical ball valve member located movably within said housing above said seat and arranged to provide sealing engagement with said seat in a first, lower position, whereby flow of fluids through said seat from above said seat is substantially prevented, and further arranged to provide a second, upper position whereby flow of fluids may be achieved through said seat from below;
   said ball member having a conical cavity therein opening radially into said member; and
   a conical guide member located concentrically in said housing flow passage above said ball seat and ball member and spaced a sufficient distance thereabove to allow said ball member to move substantially out of the passage in said seat in response to fluid pressure from below said seat;
   said conical guide member having flow passages therethrough and further having a downwardly projecting conical section aligned substantially coaxially with said ball member and said seat passage;
   said conical section further arranged to project at all times into said conical cavity and further adapted to provide substantial clearance therebetween to allow said ball member to undergo partial rotation about any axis with respect to said conical guide member whereby said ball member is capable of exposing a plurality of seat surfaces to said ball seat passage.

* * * * *